United States Patent
Sasadai (10) Patent No.: US 9,639,138 B2
(45) Date of Patent: May 2, 2017

(54) ELECTRONIC DEVICE THAT ENSURES REDUCED UNNECESSARY RECOVERY

(71) Applicant: Kyocera Document Solutions Inc., Osaka (JP)

(72) Inventor: Koji Sasadai, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 243 days.

(21) Appl. No.: 14/529,186

(22) Filed: Oct. 31, 2014

(65) Prior Publication Data
US 2015/0121102 A1    Apr. 30, 2015

(30) Foreign Application Priority Data

Oct. 31, 2013  (JP) .................................. 2013-227429

(51) Int. Cl.
*G06F 1/32* (2006.01)
*G06F 3/06* (2006.01)

(52) U.S. Cl.
CPC .......... *G06F 1/3209* (2013.01); *G06F 1/3284* (2013.01); *G06F 3/06* (2013.01); *Y02B 60/1267* (2013.01)

(58) Field of Classification Search
CPC .... G06F 1/3209; G06F 1/3284; G06F 1/3243; G06F 1/3278; G06F 1/3293; G06F 3/06; Y02B 60/1267; Y02B 60/1271; Y02B 60/34
See application file for complete search history.

(56) References Cited

U.S. PATENT DOCUMENTS

| 2005/0021728 | A1* | 1/2005 | Sugimoto | G06F 3/1204 709/223 |
| 2009/0259868 | A1* | 10/2009 | Katoh | G03G 15/5004 713/324 |
| 2011/0235535 | A1* | 9/2011 | Furukawa | G06F 1/3203 370/252 |
| 2012/0210112 | A1 | 8/2012 | Suganami | |

FOREIGN PATENT DOCUMENTS

| JP | 2003-089254 A | 3/2003 |
| JP | 2007-052544 A | 3/2007 |
| JP | 2008-123128 A | 5/2008 |
| JP | 2010-094925 A | 4/2010 |
| JP | 2010-166310 A | 7/2010 |
| JP | 2011-068038 A | 4/2011 |

* cited by examiner

Primary Examiner — Dennis M Butler
(74) Attorney, Agent, or Firm — James Judge (57) ABSTRACT

An electronic device includes a main system, a sub system, and a response availability information storage unit. The response availability information storage unit stores response availability information indicating in which communication protocol the response data is generable by the main system. The sub system causes the main system not to recover to a normal state when the main system is in an energy saving state and the electronic device receives the information request data from the outside, if the sub system determines that the response data is not generable by the main system, based on the communication protocol of the information request data and the response availability information stored in the response availability information storage unit, and even if the response data is not generable by the sub system.

4 Claims, 6 Drawing Sheets

| Communication Protocol | Correspondence Availability |
|---|---|
| ARP | ON |
| ⁎ | ⁎ |
| ⁎ | ⁎ |
| ⁎ | ⁎ |
| SNMP | ON |
| ⁎ | ⁎ |
| ⁎ | ⁎ |
| ⁎ | ⁎ |

ELECTRONIC DEVICE THAT ENSURES REDUCED UNNECESSARY RECOVERY

INCORPORATION BY REFERENCE

This application is based upon, and claims the benefit of priority from, corresponding Japanese Patent Application No. 2013-227429 filed in the Japan Patent Office on Oct. 31, 2013, the entire contents of which are incorporated herein by reference.

BACKGROUND

Unless otherwise indicated herein, the description in this section is not prior art to the claims in this application and is not admitted to be prior art by inclusion in this section.

There is known an electronic device that includes a main system and a sub system. The main system has a normal state and an energy saving state that consumes less energy than the normal state does. The sub system transmits and receives data to and from outside. In this electronic device, while the main system is in the energy saving state, if the sub system receives information request data for requesting information from the outside and can generate response data to the information request data, the sub system generates the response data. On the other hand, with this electronic device, while the main system is in the energy saving state, if the sub system receives the information request data from the outside but cannot generate the response data, the main system recovers to the normal state and generates the response data.

SUMMARY

An electronic device according to an aspect of the disclosure includes a main system, a sub system, and a response availability information storage unit. The main system has at least two states of a normal state and an energy saving state. The energy saving state consumes less energy than the normal state. The sub system transmits and receives data to and from outside. When the main system is in the energy saving state and the electronic device receives information request data that requests information from the outside, and if response data to the information request data is not generable by the sub system, the sub system causes the main system to recover to the normal state. The response availability information storage unit stores response availability information. The response availability information indicates in which communication protocol the response data is generable by the main system. The sub system causes the main system not to recover to the normal state when the main system is in the energy saving state and the electronic device receives the information request data from the outside, if the sub system determines that the response data is not generable by the main system, based on the communication protocol of the information request data and the response availability information stored in the response availability information storage unit, and even if the response data is not generable by the sub system.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure using the drawings.

First, the following describes a constitution of a Multi-function Peripheral (MFP) as an electronic device according to the embodiment.

Figure 1:
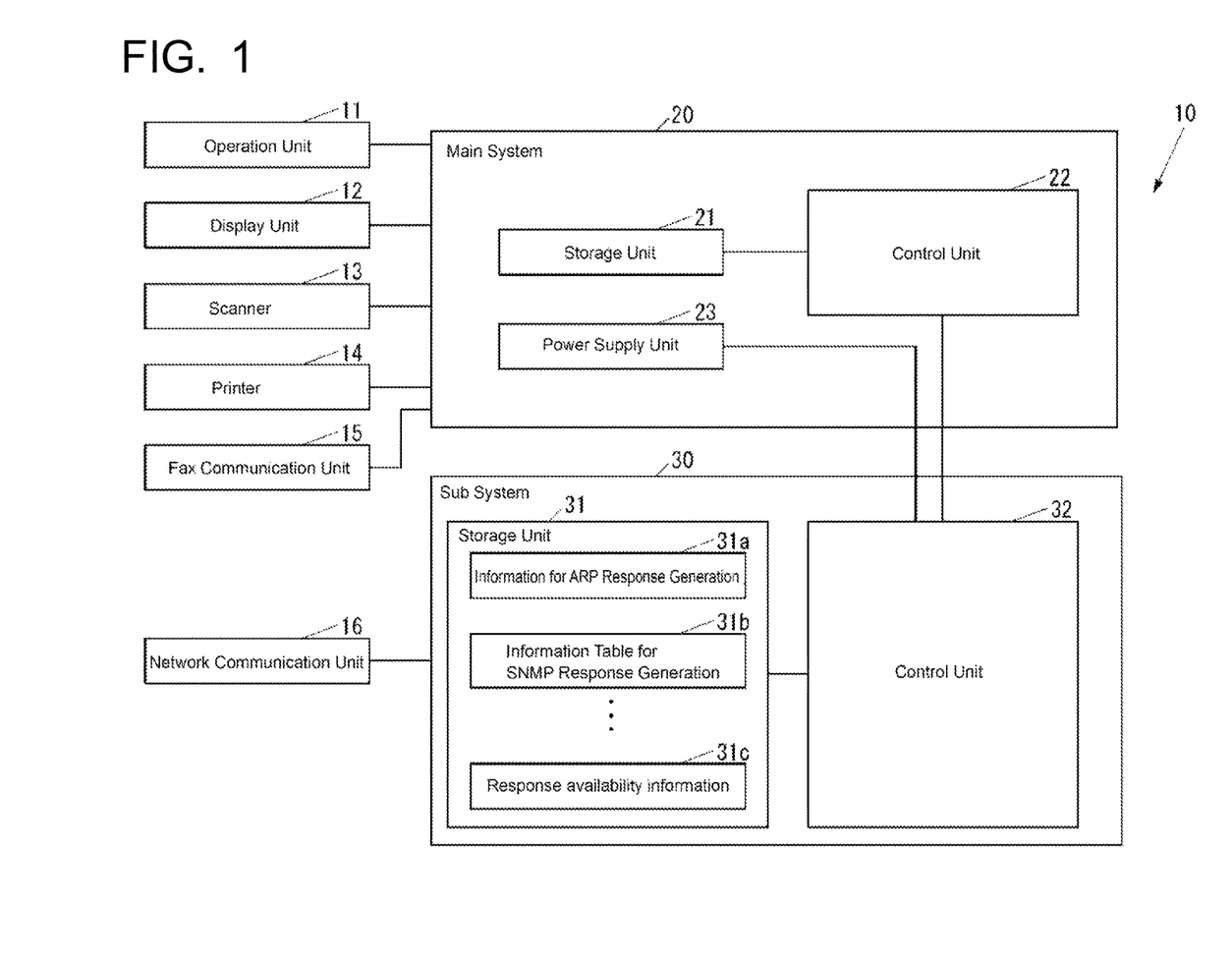
FIG. 1 illustrates an MFP according to an embodiment of the disclosure.

FIG. 1 illustrates an MFP 10 according to this embodiment.

As illustrated in FIG. 1, the MFP 10 includes an operation unit 11, a display unit 12, a scanner 13, a printer 14, a fax communication unit 15, a network communication unit 16, a main system 20, and a sub system 30. The operation unit 11 is an input device such as a button with which a user inputs various operations. The display unit 12 is a display device such as a Liquid Crystal Display (LCD) that displays various information. The scanner 13 is a reading device that reads an image from a document. The printer 14 is a print device that performs printing on a recording medium such as a paper sheet. The fax communication unit 15 is a fax device that performs fax communications with an external facsimile device (not illustrated) via a communication line such as a dial-up line. The network communication unit 16 is a network communication device that communicates with an external device via a network such as a Local Area Network (LAN) and the Internet. The main system 20 controls the entire MFP 10. The sub system 30 transmits and receives data to and from the outside via the network communication unit 16.

The main system 20 has at least two states of a normal state and an energy saving state that consumes less energy than the normal state does.

The main system 20 includes a storage unit 21, a control unit 22, and a power supply unit 23. The storage unit 21 is a non-volatile storage device such as an Electrically Erasable Programmable Read Only Memory (EEPROM) and a Hard Disk Drive (HDD) that stores various data. The control unit 22 controls the entire main system 20. The power supply unit 23 supplies electric power to respective units of the main system 20.

The control unit 22 includes, for example, a central processing unit (CPU), a read only memory (ROM) that stores a program and various data, and a random access memory (RAM) that is used for a work area of the CPU. The CPU executes a program stored in the ROM.

The sub system 30 receives information request packets in various communication protocols such as an Address Resolution Protocol (ARP) and a Simple Network Management Protocol (SNMP), as information request data from the outside via the network communication unit 16. Additionally, the sub system 30 transmits response packets in various communication protocols such as the ARP and the SNMP as response data to information request data, to the outside via the network communication unit 16.

The sub system 30 includes a storage unit 31 and a control unit 32. The storage unit 31 is a storage device such as the EEPROM and the HDD that stores various data. The control unit 32 controls the entire sub system 30.

The storage unit 31 can store information for ARP response generation 31*a* and an information table for SNMP response generation 31*b*. The information for ARP response generation 31*a* is information for response generation required to generate a response packet to an information request packet in the ARP. The information table for SNMP response generation 31*b* stores information for response generation required to generate the response packet to the information request packet of the SNMP. The storage unit 31 can store the information for response generation, as well as the ARP and the SNMP. The information for response generation is required to generate a response packet to the information request packets in various communication protocols. That is, the storage unit 31 constitutes an information storage unit for response generation according to the disclosure.

The information for ARP response generation 31*a* is constituted of an Internet Protocol (IP) address of the MFP 10 and a Media Access Control (MAC) address (Ethernet (registered trademark) address) of the MFP 10.

Figure 2:
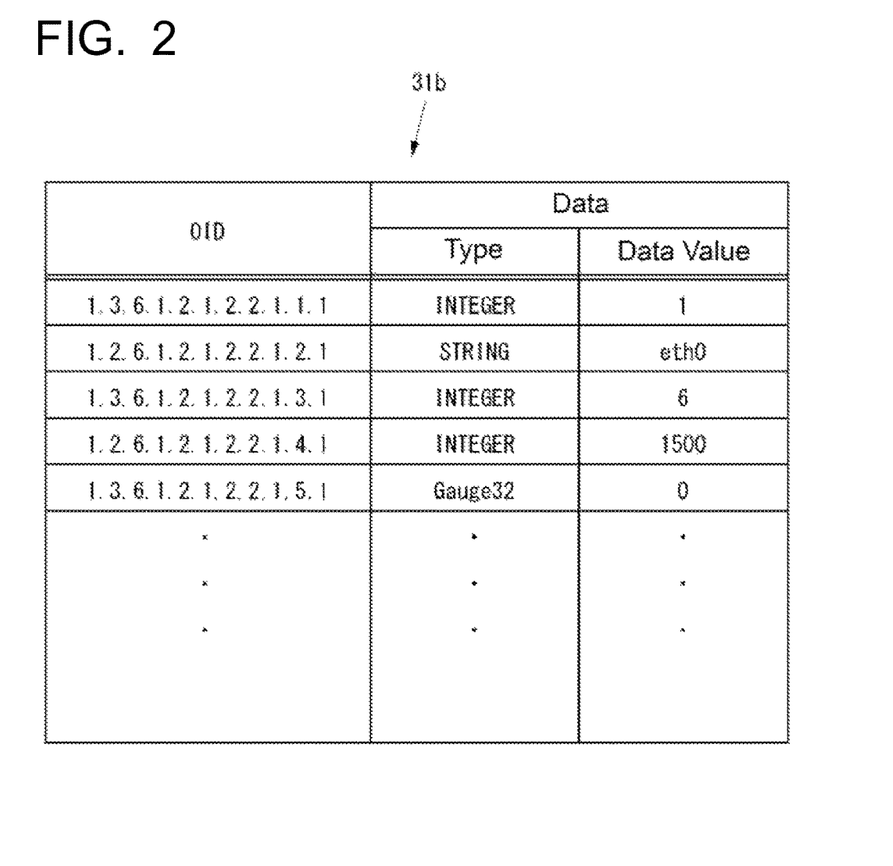
FIG. 2 illustrates an exemplary information table for SNMP response generation according to the embodiment.

FIG. 2 illustrates an exemplary information table for SNMP response generation 31*b*.

As illustrated in FIG. 2, the information table for SNMP response generation 31*b* stores a combination of an Object Identifier (OID) and data. The OID is indicative of an identifier for distinguishing an object. The object is individual management information stored in a Management Information Base (MIB) of the SNMP. The combinations are respective bits of information for response generation. The data is constituted of a data type such as an integer type (INTEGER) and a character string type (STRING) and a value such as "1" and "eth0."

As illustrated in FIG. 1, the storage unit 31 can store response availability information 31*c*. The response availability information 31*c* indicates which response packets in the communication protocols can be generated by the main system 20. That is, the storage unit 31 constitutes a response availability information storage unit of the disclosure.

Figure 3:
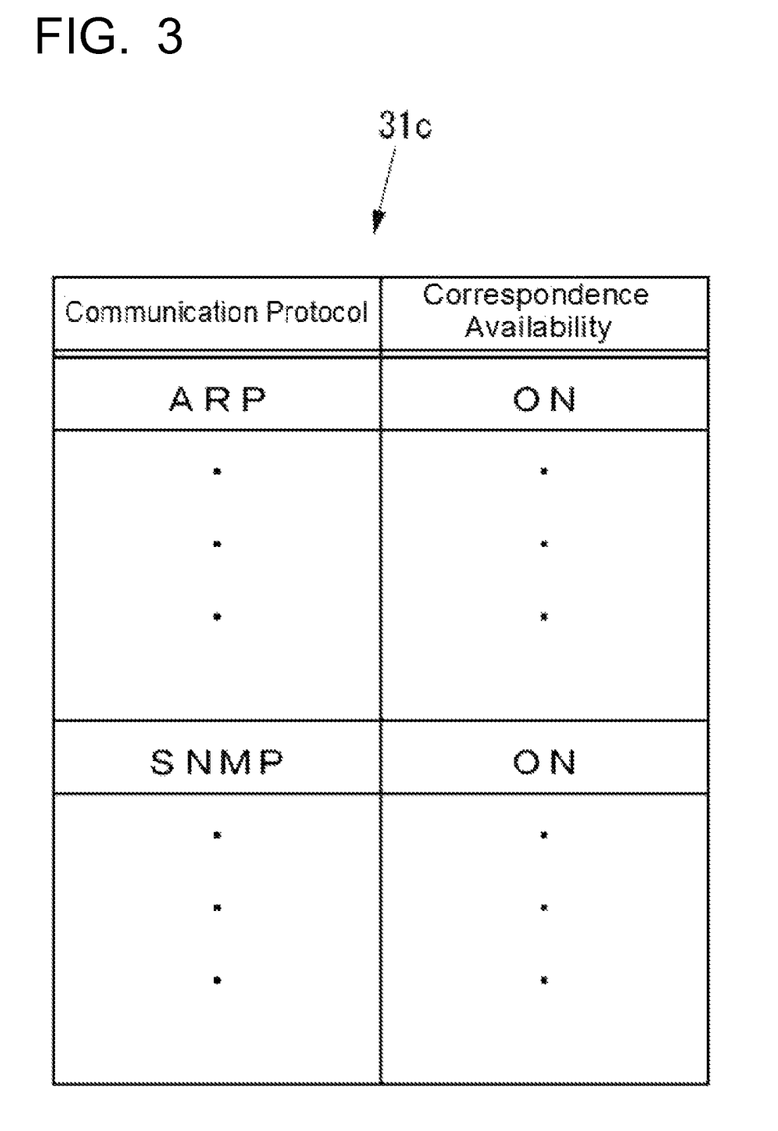
FIG. 3 illustrates exemplary response availability information according to the embodiment.

FIG. 3 illustrates the exemplary response availability information 31*c*.

As illustrated in FIG. 3, the response availability information 31*c* is information indicating whether the main system 20 supports the various communication protocols or not, for each communication protocol. The main system 20 can generate the response packets in communication protocols that can be supported. In the response availability information 31*c* illustrated in FIG. 3, the communication protocol supported by the main system 20 stores a value of "ON" in a field of correspondence availability. On the other hand, the communication protocol not supported by the main system 20 stores a value of "OFF" in the field of correspondence availability (not illustrated). A communication protocol not supported by the main system 20 includes a communication protocol that originally cannot be a process target of the MFP 10 in terms of functionality of the MFP 10 and a communication protocol that can be the process target of the MFP 10 in terms of functionality of the MFP 10 but is currently out of the process target.

The control unit 32 illustrated in FIG. 1 includes, for example, a CPU, a ROM that stores a program and various data, and the RAM that is used for a work area of the CPU. The CPU executes a program stored in the ROM.

The following describes operations by the MFP 10.

Figure 4:
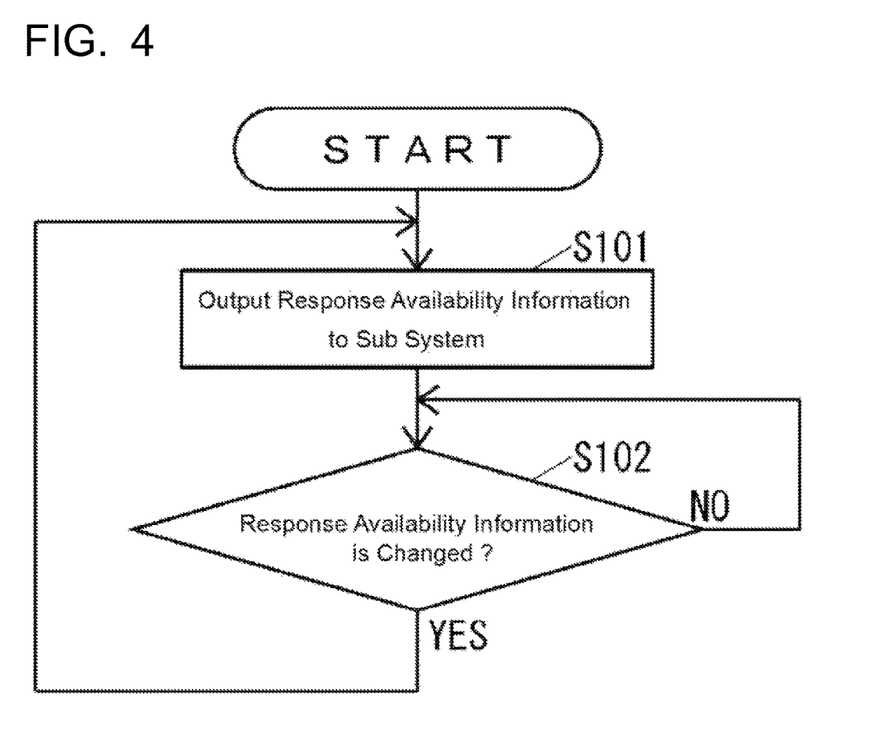
FIG. 4 illustrates an operation of a main system according to the embodiment when outputting response availability information.

FIG. 4 illustrates an operation of the main system 20 when outputting the response availability information.

The main system 20 in the normal state performs the operations illustrated in FIG. 4.

As illustrated in FIG. 4, the control unit 22 of the main system 20 outputs the response availability information to the sub system 30 (Step S101).

Here, when the control unit 32 of the sub system 30 inputs the response availability information output from the main system 20, the control unit 32 causes the storage unit 31 to store the response availability information as the response availability information 31*c*.

The control unit 22 of the main system 20 determines whether the response availability information has been changed or not until the response availability information is determined to be changed after the process of Step S101 (Step S102).

When the control unit 22 determines that the response availability information has been changed at Step S102, the control unit 22 performs the process of Step S101.

Figure 5:
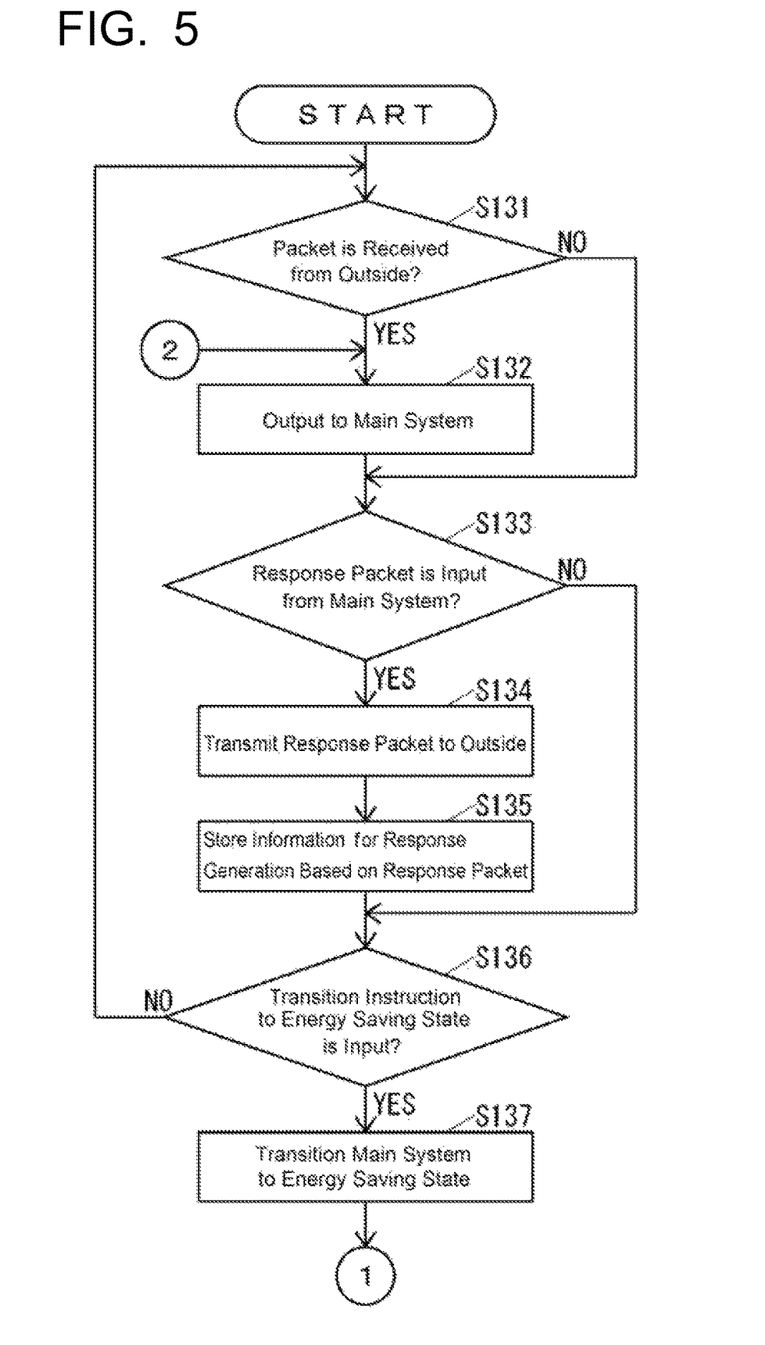
FIG. 5 illustrates an operation of a sub system according to the embodiment.
Figure 6:
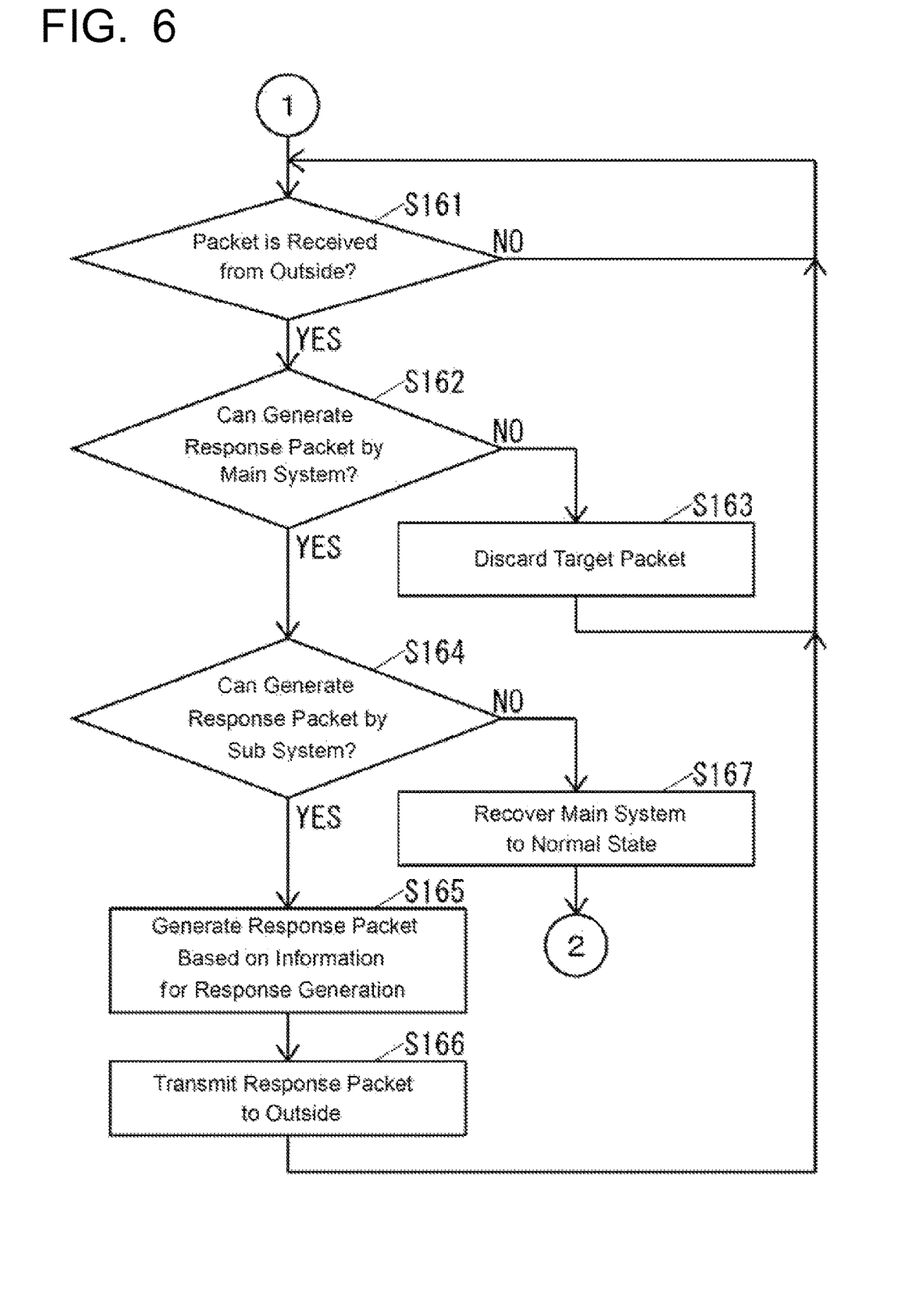
FIG. 6 illustrates an operation subsequent to the operation of the sub system according to the embodiment.

FIG. 5 illustrates an operation of the sub system 30. FIG. 6 illustrates an operation subsequent to the operations illustrated in FIG. 5.

At the start of the MFP 10, the control unit 32 of the sub system 30 starts the operations illustrated in FIG. 5 and FIG. 6. At the point when the MFP 10 is started, the power supply unit 23 supplies electric power to the respective units of the main system 20, and the main system 20 is in the normal state.

As illustrated in FIG. 5 and FIG. 6, the control unit 32 of the sub system 30 determines whether or not a packet is received from the outside via the network communication unit 16 (Step S131).

At Step S131, when the control unit 32 determines that the packet has been received from the outside, the control unit 32 outputs this packet to the main system 20 (Step S132).

Here, when the control unit 22 of the main system 20 inputs the packet output from the sub system 30, the control unit 22 processes this packet. When the packet input from the sub system 30 is the information request packet and the control unit 22 generates a response packet to the information request packet, the control unit 22 outputs this response packet to the sub system 30. The control unit 22 sets a transmission source of the information request packet to a transmission destination of the response packet.

When the control unit 32 of the sub system 30 determines that the packet has not been received from the outside at Step S131 or the process of Step S132 is terminated, the control unit 32 determines whether or not the response packet output from the main system 20 is input (Step S133).

When the control unit 32 determines that the response packet has been input from the main system 20 at Step S133, the control unit 32 transmits the response packet input from the main system 20 to the outside via the network communication unit 16 (Step S134).

Next, the control unit 32 causes the storage unit 31 to store the information for response generation based on the response packet transmitted at Step S134 (Step S135).

For example, when the response packet transmitted at Step S134 is the response packet in the ARP, the control unit 32 causes the storage unit 31 to store the IP address and the MAC address for the transmission source included in this response packet as the information for ARP response generation 31*a*. When the response packet transmitted at Step S134 is the response packet in the SNMP, the control unit 32 causes the storage unit 31 to store the OID and a data type and a value for the OID included in this response packet as one bit of information for response generation of the information table for SNMP response generation 31*b*.

When the control unit 32 determines that the response packet has not been input from the main system 20 at Step S133 or the process of Step S135 is terminated, the control unit 32 determines whether or not a transition instruction to an energy saving state has been input from the main system 20 (Step S136).

If a specific condition, such as elapse of specific time, is met, the control unit 22 of the main system 20 performs a self-refresh process that saves the data stored in the RAM of the control unit 22 to the storage unit 21 and then outputs the transition instruction to the energy saving state to the sub system 30.

When the control unit 32 of the sub system 30 determines that the transition instruction to the energy saving state has not been input from the main system 20 at Step S136, the control unit 32 performs the process of Step S131.

When the control unit 32 determines that the transition instruction to the energy saving state has been input from the main system 20 at Step S136, the control unit 32 causes the power supply unit 23 of the main system 20 to terminate supply of electric power to the respective units of the main system 20 so as to transition the main system 20 from the normal state to the energy saving state (Step S137).

Next, the control unit 32 determines whether the packet has been received from the outside or not until the control unit 32 determines that the packet has been received from the outside via the network communication unit 16 (Step S161).

When the control unit 32 determines that the packet has been received from the outside at Step S161, the control unit 32 determines whether the main system 20 can generate the response packet to the packet determined to be received from the outside at Step S161 (hereinafter referred to as a "target packet") or not, based on the communication protocol of the target packet and the response availability information 31*c* (Step S162).

When the control unit 32 determines that the main system 20 cannot generate the response packet at Step S162, the control unit 32 discards the target packet (Step S163) and then performs the process at Step S161.

When the control unit 32 determines that the main system 20 can generate the response packet at Step S162, the control unit 32 determines whether the sub system 30 can generate the response packet to the target packet or not based on the information for response generation on the storage unit 31 (Step S164). Here, when the storage unit 31 does not store the information for response generation appropriate for the communication protocol of the target packet and the content of the target packet, the control unit 32 determines that the sub system 30 cannot generate the response packet.

For example, when the target packet is the information request packet in the ARP, the control unit 32 determines whether the sub system 30 can generate the response packet in the ARP to the information request packet or not, based on the IP address and the MAC address of the information for ARP response generation 31*a*. When the target packet is the information request packet in the SNMP, the control unit 32 determines whether the sub system 30 can generate the response packet in the SNMP to this information request packet or not, based on the combination of the OID on the information table for SNMP response generation 31*b*, the data type, and the value.

When the control unit 32 determines that the sub system 30 can generate the response packet at Step S164, the control unit 32 generates the response packet to the target packet, based on the information for response generation on the storage unit 31 (Step S165). The control unit 32 sets the transmission source of the target packet as the transmission destination of the response packet.

For example, when the target packet is the information request packet in the ARP, the control unit 32 generates the response packet in the ARP based on the IP address and the MAC address of the information for ARP response generation 31*a*. When the target packet is the information request packet in the SNMP, the control unit 32 generates the response packet in the SNMP based on the combination of the OID on the information table for SNMP response generation 31*b*, the data type, and the value.

When the process of Step S165 is terminated, the control unit 32 transmits the response packet generated at Step S165 to the outside via the network communication unit 16 (Step S166) and performs the process of Step S161.

When the control unit 32 determines that the sub system 30 cannot generate the response packet at Step S164, the control unit 32 causes the power supply unit 23 of the main system 20 to start supply of electric power to the respective units of the main system 20 so as to recover the main system 20 from the energy saving state to the normal state (Step S167).

When the control unit 22 of the main system 20 transitions from the energy saving state to the normal state, the control unit 22 restores the data saved to the storage unit 21 to the RAM of the control unit 22.

When the process of Step S167 is terminated, the control unit 32 of the sub system 30 performs the process of Step S132. Accordingly, the main system 20 can process the packet received from the outside via the network communication unit 16.

As described above, when the main system 20 is in the energy saving state and the sub system 30 receives the information request packet from the outside (YES at Step S161), if the sub system 30 determines that the response packet can be generated based on the information for response generation stored in the storage unit 31 (YES at Step S164), the sub system 30 generates the response packet (Step S165). When the main system 20 is in the energy saving state and the sub system 30 receives the information request packet from the outside (YES at Step S161), if the sub system 30 determines that the response packet cannot be generated based on the information for response generation stored in the storage unit 31 (NO at Step S164), the sub system 30 causes the main system 20 to recover to the normal state (Step S167).

When the main system 20 is in the energy saving state and the sub system 30 receives the information request packet from the outside (YES at Step S161), if the sub system 30 determines that the main system 20 cannot generate the response packet based on the information for response generation stored in the storage unit 31 (NO at Step S162), even if the sub system 30 itself cannot generate the response packet, the sub system 30 causes the main system 20 not to recover to the normal state. That is, when the main system 20 is in the energy saving state and the sub system 30 receives the information request packet in the communication protocol, to which the response packet cannot be generated by the main system 20, from the outside (YES at Step S161 and NO at Step S162), the MFP 10 causes the main system 20 not to recover to the normal state. Accordingly, the MFP 10 can reduce unnecessary recovery of the main system 20. Consequently, the energy saving state can be maintained for a long period and therefore can improve energy saving performance.

When the main system 20 is in the normal state and the main system 20 receives the information request packet from the outside (YES at Step S131), the sub system 30 causes the storage unit 31 to store the information for response generation based on the response packet generated by the main system 20 (YES at Steps S133 and S135). That is, when the main system 20 is in the normal state, the MFP 10 causes the storage unit 31 to store the information for response generation by the sub system 30. With this constitution, when the main system 20 is in the normal state, the MFP 10 causes the sub system 30 to automatically increase the information request packets to which the sub system 30 can generate the response packets. Accordingly, when the sub system 30 receives the information request packet from the outside while the main system 20 is in the normal state, unnecessary recovery of the main system 20 can be reduced. Consequently, the energy saving state can be maintained for a long period and therefore can improve the energy saving performance.

While in the embodiment the sub system 30 causes the storage unit 31 to store the response availability information based on whether the main system 20 supports various communication protocols or not, the sub system 30 may cause the storage unit 31 to store the response availability information based on a port number opening to the main system 20 side. With this constitution, in the MFP 10, the sub system 30 can easily obtain the response availability information, thus ensuring reduction of a load of the process.

While in the MFP 10 the main system 20 inputs the response availability information to the sub system 30 at the timing of the main system 20 side, the main system 20 may input the response availability information to the sub system 30 according to a request from the sub system 30 side.

This embodiment describes the ARP and the SNMP as examples of the communication protocols in which the main system 20 can generate the response packet. However, the main system 20 may be able to generate the response packet in other communication protocols or may be not able to generate the response packet of at least one of the ARP and the SNMP.

The electronic device of the disclosure is an MFP in this embodiment; however, the electronic device may be an image forming apparatus other than the MFP such as a printer-only machine or may be an electronic device other than the image forming apparatus.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electronic device comprising:
    a main system that has at least two states, a normal state and an energy-saving state, the energy-saving state being a state in which the main system consumes less energy than in the normal state;
    a sub-system that transmits and receives data to and from outside, and that when the main system is in the energy-saving state and the electronic device receives information-request data requesting information from the outside, if response data to the information-request data is not generable by the sub-system, causes the main system to recover to the normal state; and
    a first memory storing response-availability information, the response-availability information indicating in which communication protocol the response data is generable by the main system; wherein
    the sub-system causes the main system not to recover to the normal state when the main system is in the energy-saving state and the electronic device receives the information-request data from the outside, if the sub-system determines that the response data is not generable by the main system, based on the communication protocol of the information-request data and the response-availability information stored in the first memory, and if the response data is also not generable by the sub-system;
    a second memory that stores information for response generation, the information for response generation being used to generate the response data to the information request data; wherein
    when the main system is in the normal state and the electronic device receives the information request data from the outside, the sub-system causes the second memory to store the information for response generation based on the response data generated by the main system, and
    when the main system is in the energy saving state and the electronic device receives the information request data from the outside, if the sub-system determines that the response data is generable based on the information for response generation stored in the second memory, the sub-system generates the response data.

2. An electronic device comprising:
    a main system that has at least two states, a normal state and an energy-saving state, the energy-saving state being a state in which the main system consumes less energy than in the normal state;
    a sub-system that transmits and receives data to and from outside, and that when the main system is in the energy-saving state and the electronic device receives information-request data requesting information from the outside, if response data to the information-request data is not generable by the sub-system, causes the main system to recover to the normal state; and
    a first memory storing response-availability information, the response-availability information indicating in which communication protocol the response data is generable by the main system; wherein
    the sub-system causes the main system not to recover to the normal state when the main system is in the energy-saving state and the electronic device receives the information-request data from the outside, if the sub-system determines that the response data is not generable by the main system, based on the communication protocol of the information-request data and the response-availability information stored in the first memory, and if the response data is also not generable by the sub-system, and the sub system causes the first memory to store the response-availability information based on a port number opening to the main system side.

3. A method of controlling an electronic device that includes a main system having at least two states, a normal state and an energy-saving state, the energy-saving state being a state in which the main system consumes less energy than in the normal state, a sub-system that transmits and receives data to and from outside, and a first memory, the method comprising:

having the sub-system cause the main system to recover to the normal state when the main system is in the energy-saving state and the electronic device receives information-request data requesting information from the outside via the sub-system, if response data to the information-request data is not generable by the sub-system;

reading response-availability information from the first memory, the response-availability information indicating in which communication protocol the response data is generable by the main system via the sub-system;

causing the main system not to recover to the normal state when the main system is in the energy-saving state and the electronic device receives the information request data from the outside via the sub-system, if the sub-system determines that the response data is not generable by the main system, based on the communication protocol of the information request data and the response-availability information read from the first memory, and if the response data is also not generable by the sub-system; and having the sub system cause the first memory to store the response-availability information based on a port number opening to the main system side.

4. A non-transitory computer-readable recording medium storing a program for controlling an electronic device, the program causing the electronic device to function as:

a main system that has at least two states, a normal state and an energy-saving state, the energy-saving state being a state in which the main system consumes less energy than in the normal state;

a sub-system that transmits and receives data to and from outside, and that when the main system is in the energy-saving state and the electronic device receives information-request data requesting information from the outside, if response data to the information request data is not generable by the sub-system, causes the main system to recover to the normal state; and a first memory storing response-availability information, the response-availability information indicating in which communication protocol the response data is generable by the main system; wherein the sub-system causes the main system not to recover to the normal state when the main system is in the energy-saving state and the electronic device receives the information-request data from the outside, if the sub-system determines that the response data is not generable by the main system, based on the communication protocol of the information-request data and the response-availability information stored in the first memory, and if the response data is also not generable by the sub-system, and the sub system causes the first memory to store the response-availability information based on a port number opening to the main system side.

* * * * *